US012576863B2

(12) United States Patent
Kim

(10) Patent No.: US 12,576,863 B2
(45) Date of Patent: Mar. 17, 2026

(54) STEERING CONTROL DEVICE AND METHOD OF VEHICLE

(71) Applicant: HL MANDO CORPORATION, Gyeonggi-do (KR)

(72) Inventor: Jin Soo Kim, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 215 days.

(21) Appl. No.: 18/241,220

(22) Filed: Aug. 31, 2023

(65) Prior Publication Data

US 2024/0359697 A1      Oct. 31, 2024

(30) Foreign Application Priority Data

Apr. 26, 2023      (KR) ........................ 10-2023-0054925

(51) Int. Cl.
*B60W 50/035* (2012.01)
*B60W 10/184* (2012.01)
*B60W 10/20* (2006.01)
*B62D 7/14* (2006.01)

(52) U.S. Cl.
CPC ........ *B60W 50/035* (2013.01); *B60W 10/184* (2013.01); *B60W 10/20* (2013.01); *B60W 2520/14* (2013.01); *B60W 2540/18* (2013.01); *B60W 2710/18* (2013.01); *B60W 2710/20* (2013.01); *B60W 2720/14* (2013.01); *B62D 7/14* (2013.01)

(58) Field of Classification Search
CPC .. B60W 50/035; B60W 10/184; B60W 10/20; B60W 2520/14; B60W 2540/18; B60W 2710/18; B60W 2710/20; B60W 2720/14; B60W 2050/0297; B60W 2520/403; B60W 2520/406; B60W 2552/30; B60W 50/029; B62D 7/14; B62D 6/003; B62D 7/159; B62D 5/0484; B62D 5/003; B62D 9/005; B60Y 2400/84

See application file for complete search history.

(56) References Cited

U.S. PATENT DOCUMENTS

| | | | | |
|---|---|---|---|---|
| 10,046,743 | B2 * | 8/2018 | Jonasson ................ | B62D 9/005 |
| 10,604,182 | B2 * | 3/2020 | Kim ........................ | B62D 7/159 |
| 11,221,620 | B2 * | 1/2022 | Kondo ................. | G05D 1/0231 |
| 12,195,082 | B2 * | 1/2025 | Schumann ........... | B62D 15/025 |
| 2004/0064229 | A1 * | 4/2004 | Stout ........................ | B62D 6/02 |
| | | | | 180/443 |
| 2005/0080532 | A1 * | 4/2005 | Kato ...................... | B62D 6/003 |
| | | | | 180/443 |
| 2008/0289897 | A1 * | 11/2008 | Williams ............... | B62D 5/003 |
| | | | | 180/402 |

(Continued)

*Primary Examiner* — Kurt Philip Liethen
(74) *Attorney, Agent, or Firm* — WOMBLE BOND DICKINSON (US) LLP

(57) ABSTRACT

The embodiments may provide a steering control device of a vehicle equipped with a steer-by-wire steering system and a rear wheel steering system. A steering control device may include a sensor configured to acquire information on the vehicle, and a controller configured to, in response to a determination of a failure of the steer-by-wire steering system, determine a target yaw rate according to a target steering angle based on the information acquired from the sensor, and generate and output a differential braking control signal and a rear wheel steering control signal to follow the target yaw rate.

8 Claims, 12 Drawing Sheets

(56) References Cited

U.S. PATENT DOCUMENTS

| | | | |
|---|---|---|---|
| 2011/0246040 A1* | 10/2011 | Nakayama | B60T 8/17557 |
| | | | 701/70 |
| 2019/0054916 A1* | 2/2019 | Akiyama | B60G 17/016 |
| 2020/0079365 A1* | 3/2020 | Choi | B60W 10/20 |
| 2021/0269087 A1* | 9/2021 | Zhao | B62D 5/0484 |
| 2023/0055296 A1* | 2/2023 | LaBarbera | B60T 8/1755 |
| 2023/0174107 A1* | 6/2023 | Zhang | B60W 50/0225 |
| | | | 701/23 |

* cited by examiner

400

STEERING CONTROL DEVICE AND METHOD OF VEHICLE

CROSS REFERENCE TO RELATED APPLICATION

This application claims priority from Korean Patent Application No. 10-2023-0054925, filed on Apr. 26, 2023, which is hereby incorporated by reference for all purposes as if fully set forth herein.

TECHNICAL FIELD

Embodiments of the present disclosure relate to a steering control device and method of a vehicle.

In general, a steering system of a vehicle may refer to a system capable of changing a steering angle of a wheel based on a steering force (or rotational force) applied to a steering wheel by a driver of the vehicle. The steering system may be implemented by various manners, for example, an electronic steering device has been applied to a vehicle in order to reduce a steering force of a steering wheel to ensure stability of a steering state.

Recently, as a vehicle chassis system of a by-wire method provides high efficiency, a steer-by-wire (SbW) system and a brake-by-wire (BbW) system are being actively developed. In particular, in the case of the SbW system, a steering wheel operation of a driver and a rack actuator operation are performed by using an electric motor signals without an intermediate physical connection (e.g., steering column). Therefore, if a failure such as a communication failure occurs, there may be difficult to achieve target steering for the driver or autonomous driving.

In this aspect, the importance of securing a redundancy function in preparation for failure of the SbW system is further emphasized. Therefore, there is a need for a method capable of performing safe steering in the case of a failure in the SbW system.

SUMMARY

Embodiments of the present disclosure is to provide a steering control device and method of a vehicle capable of, in the case of a failure of a steering system in a vehicle having a steer-by-wire (SbW) system and a rear wheel steering (RWS) system, controlling the vehicle with target steering direction by using a differential braking and a rear wheel steering without additional mechanical designs.

In an aspect of the present disclosure, there is provided a steering control device of a vehicle equipped with a steer-by-wire steering system and a rear wheel steering system, including a sensor configured to acquire information on the vehicle, and a controller configured to, in response to a determination of a failure of the steer-by-wire steering system, determine a target yaw rate according to a target steering angle based on the information acquired from the sensor, and generate and output a differential braking control signal and a rear wheel steering control signal to follow the target yaw rate.

In another aspect of the present disclosure, there is provided a steering control method of a vehicle equipped with a steer-by-wire steering system and a rear wheel steering system, including determining, in response to a determination of a failure of the steer-by-wire steering system, a target yaw rate according to a target steering angle based on information acquired from a sensor, and generating and outputting a differential braking control signal and a rear wheel steering control signal to follow the target yaw rate.

According to embodiments of the present disclosure, in the case of a failure of a steering system in a vehicle equipped with a SbW system and a RWS system, there may be performed a target steering by using differential braking and rear wheel steering control, thereby providing a safe steering control device and method without additional mechanical design.

In addition, according to embodiments of the present disclosure, an effect of the negative scrub radius during differential braking may be compensated through rear wheel steering control, it is possible to secure redundancy for the steering system and driver safety while maintaining the negative scrub radius designed to secure vehicle stability.

In addition, according to the present embodiments, it is possible to provide a differential-braking-based steer-by-brake (SbB) system integrated with rear wheel steering control for a vehicle equipped with the SbW system and the RWS system.

DETAILED DESCRIPTION

Figure 1:
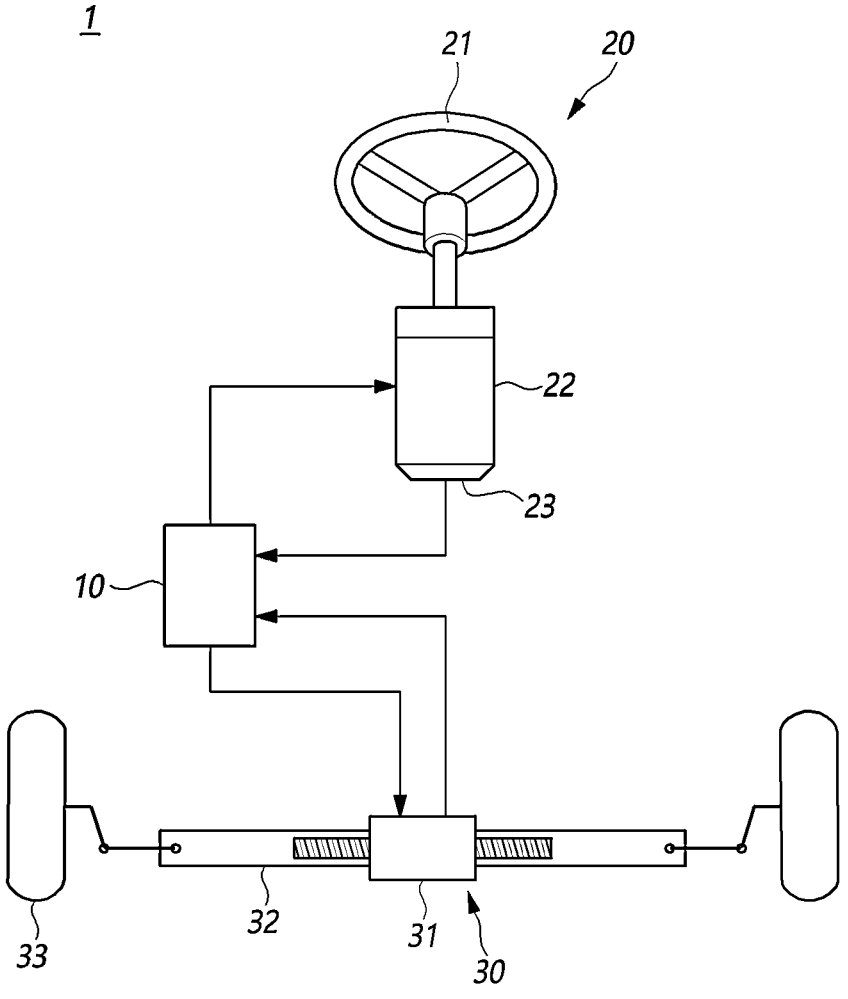
FIG. 1 is a schematic block diagram of a steering system according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Unless otherwise defined, all terms (including technical and scientific terms) used in the present disclosure will be used in a meaning that can be commonly understood by those of ordinary skill in the art to which the embodiments of the present disclosure belong. In addition, terms defined in commonly used dictionaries should be not interpreted ideally or excessively unless explicitly specifically defined. In addition, terms to be described later are terms defined in consideration of functions in the embodiments of the present disclosure, which may vary according to the intention or custom of a user or operator. Therefore, the definition thereof should be made based on the contents throughout this specification.

If a driver manipulates the steering wheel to steer the vehicle, the wheel does not rotate around the center of the ground contact surface, which is the point of contact between the wheel and the ground, but rotates around a portion slightly deviated from the center of the ground contact surface according to the kingpin axis. In this specification, "a scrub radius" may mean the distance from the center of the ground contact surface to the center of rotation. In this case, if the center of rotation is toward a center of the vehicle relative to the center of the ground contact surface, it is referred to as a positive scrub radius. On the other hand, if the center of rotation is on the outside of the vehicle relative to the center of the ground contact surface, it is referred to as a negative scrub radius.

Hereinafter, it will be described a steering control device and method according to embodiments of the present disclosure with reference to the accompanying drawings.

FIG. 1 is a schematic block diagram of a steering system 1 according to an embodiment of the present disclosure.

Referring to FIG. 1, a steering system 1 according to an embodiment may include a steering control device, a steering feedback actuator (SFA), a road wheel actuator (RWA), and a rear wheel steering (RWS) system.

The steering system 1 according to an embodiment may mean a system for controlling the steering of a vehicle equipped with the steering system 1 to change according to a rotation angle of a steering wheel 21 operated by a driver.

Meanwhile, depending on whether the steering input actuator and the steering output actuator are connected with a mechanical connecting member (or linkage), the steering 1 system 1 may be a mechanical steering system in which the force (torque) generated when the driver rotates the steering wheel 20 is transmitted to the steering motor 31 through a mechanical power transmission device (e.g., linkage, etc.), and the steering motor 71 steers the front wheel. Alternatively, the steering system 1 may be a steer-by-wire (SbW) system which transmits power by transmitting and receiving electrical signals through wires and cables instead of mechanical power transmission devices. Hereinafter, the steering system 1 will be described based on the SbW system, but is not limited thereto.

The steering system 1 according to the present disclosure shown in FIG. 1 may be implemented as an SbW system with the SFA 20, the steering control device 10, and the RWA 30. As described above, in the case that the steering system 1 is a SbW system, the SFA 20 and the RWA 30 may be mechanically separated.

The SFA 20 may refer to a device into which steering information intended by a driver is input. As described above, the SFA 20 may include a steering wheel 21, a steering shaft 22, and a reaction force motor 23. In addition, although a steering not shown, gear for transmitting the rotational force of the reaction force motor 23 to the steering shaft 22 may be further included.

The steering wheel 22 may rotate between a left steering lock end and a right steering lock end with the steering shaft 22 as a rotation axis. Here, the lock end may mean a limit point at which the steering wheel can move. The lock end may include a steering damper or the like.

The reaction force motor 23 may receive a command current from the steering control device 10 and provide feedback torque to the steering wheel 21. In one embodiment, the reaction force motor 23 may receive a command current from the steering control device 10 and may be driven at a rotational speed indicated by the command current to generate a reaction force torque and transmit reaction force torque to the steering wheel 21 through a worm and a worm wheel.

The SFA 20 may include a steering angle sensor for detecting a steering angle of the steering wheel, a torque sensor for detecting a driver's torque, and a steering angle velocity sensor for detecting a steering angle velocity of the steering wheel.

The steering control device 10 may receive steering information from each sensor included in the SFA 20, calculate a control value, and output an electrical signal indicating the control value to the RWA 30. Here, the steering information may mean information including at least one of a steering angle, a steering angular velocity, and a driver's torque.

Meanwhile, the steering control device 10 calculates a control value by receiving driving information (e.g., rack position information) actually output from the RWA 30 as feedback, and may output an electrical signal indicating a control value to the SFA 20 to provide a steering feeling to the driver.

The RWA 30 may refer to a device that drives a vehicle to actually steer. The RWA 30 may include a steering motor 31, a rack 32, front wheels 33, a vehicle speed sensor, and a rack position sensor. The steering motor 31 may also be expressed as a driving motor.

In addition, the SFA 20 and the RWA 30 may further include a motor torque sensor capable of detecting motor torque of the reaction force motor 23 and the steering motor 31.

The steering motor 31 may move the rack 32 in the axial direction. Specifically, the steering motor 31 may receive command current from the steering control device 10 and drive the steering motor 32 to linearly move the rack 32 in the axial direction. That is, the rack 32 may linearly move between the left lock end, which is the left movement limit point, and the right lock end, which is the right movement limit point.

The rack 32 may perform linear motion by driving the steering motor 31, and the front wheels 33 may be steered left or right through the linear motion of the rack 32.

Although not shown, the steering system 1 may further include a clutch capable of separating or coupling the SFA 20 and the RWA 30. Here, the clutch may operate under the control of the steering control device 10.

Meanwhile, in the case that the steering system 1 is a SbW system and the vehicle travels in an autonomous driving mode, the steering system 1 may control only the RWA 30 to perform steering control of the vehicle, or may control both the SFA 20 and the RWA 30 to perform steering control of the vehicle.

Hereinafter, embodiments of the present disclosure will be described on the premise of an SbW system. However, as long as it does not contradict the technical idea of the present disclosure, the following description may also be applied to steering systems other than SbW.

Figure 2:
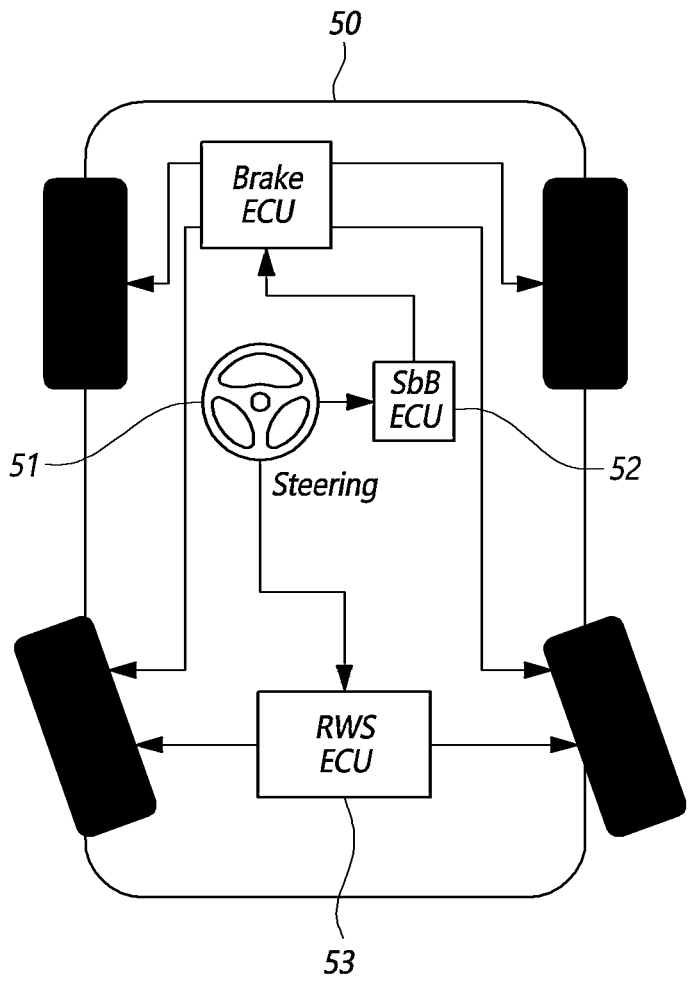
FIG. 2 is a diagram for explaining steering control of a vehicle according to an embodiment of the present disclosure.

FIG. 2 is a diagram for explaining steering control of a vehicle according to an embodiment of the present disclosure.

Referring to FIG. 2, a vehicle 50 may include a SbB electronic control unit (ECU) 52 that controls a steer-by-brake (SbB) function, and a brake ECU 54 that controls a braking system of the vehicle, and a RWS ECU (53) that control the rear wheel steering (RWS) system. If the driver performs a steering operation through the steering wheel 51, the steering of the vehicle may be controlled based on a target steering angle corresponding to the corresponding steering operation.

The SbB ECU 52 may provide a function of controlling vehicle steering through a differential braking control or a partial braking control. If a difference in left and right longitudinal force is generated through the differential braking control causing a difference in braking force to the left and right wheels of a travelling vehicle, a yaw moment and a lateral force are generated, and vehicle steering can be controlled using the yaw moment and the lateral force. In this case, the SbB ECU 52 may generate a differential braking control signal and output it to the brake ECU 54 that controls the braking system.

The RWS ECU 53 may provide a function of actively controlling the steering angle of the rear wheels according to the steering angle of the front wheels depending on a driving condition of the vehicle. The RWS ECU 53 may secure a smaller turning radius by controlling the steering of the rear wheels to the opposite side of the front wheels if the vehicle is traveling at mid-low speed. If the vehicle travels at high speed, the RWS ECU 53 may secure the stability of turning travelling by controlling the steering of the rear wheels in the same direction as the front wheels.

In FIG. 2, each ECU is illustrated as being provided independently, but is not limited thereto. Each ECU may be implemented to be integrated into a domain control unit (DCU).

Accordingly, in the case that a vehicle is equipped with a differential braking control system and a rear wheel steering control system, embodiments of the present disclosure may provide a device and method capable of performing steering control in an emergency state such as a failure by integrating corresponding control systems.

Figure 3:
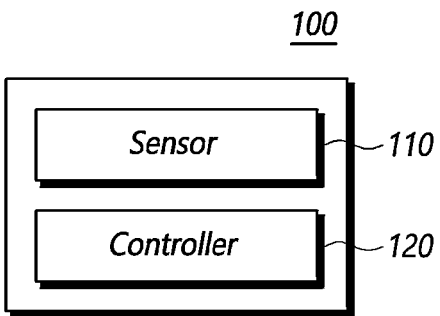
FIG. 3 is a block diagram of a steering control device according to an embodiment of the present disclosure.
Figure 4:
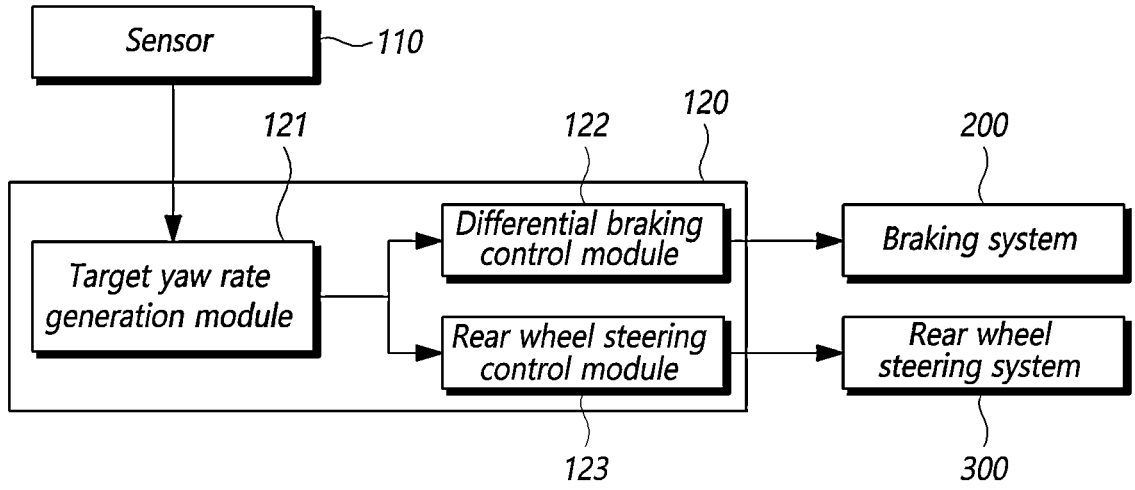
FIG. 4 is a block diagram illustrating an operation of a steering control device according to an embodiment of the present disclosure.

FIG. 3 is a block diagram of a steering control device 100 according to an embodiment of the present disclosure. FIG. 4 is a block diagram illustrating an operation of a steering control device according to an embodiment of the present disclosure.

Referring to FIG. 3, the steering control device 100 may include a sensor 100 for acquiring information on the vehicle, and a controller 120 configured to, in response to a determination of a failure of the steer-by-wire steering system, determine a target yaw rate according to a target steering angle based on the information acquired from the sensor, and generate and output a differential braking control signal and a rear wheel steering control signal to follow the target yaw rate.

The steering control device 100 may control steering of a vehicle equipped with a steer-by-wire (SbW) steering system and a rear wheel steering system. In addition, the vehicle may include a steer-by-brake (SbB) system.

The sensor 110 may include various individual sensors that acquire information about the vehicle and information about the outside of the vehicle. According to an example, the sensor 110 may include one or more sensors for detecting information about the vehicle, such as a steering angle sensor for detecting rotation angle information of a steering wheel of a vehicle, a steering angle velocity sensor for detecting steering wheel angular velocity, a rack position sensor for detecting position information of a rack, a motor torque sensor for detecting the torque of the motor in the steering system, and a current sensor for detecting the current in the steering system. In addition, the sensor 110 may include various sensors such as a camera, LIDAR, and radar sensor for detecting other vehicles or lanes outside the vehicle.

The controller 120 may control the overall operation of the steering control device 100. According to an example, the controller 120 of the steering control device may be implemented as a dedicated ECU, MCU, DCU, or the like. Alternatively, the controller 120 may be implemented so that the SbB ECU of the SbB system performs embodiments according to the present disclosure. In this case, the SbB ECU may be communicatively connected with devices necessary for performing the embodiment of the present disclosure, such as a sensor, a steering system, a rear wheel steering control system, and a braking system. The controller 120 may perform embodiments according to the present disclosure through integrated control of devices such as the sensor, the steering system, the rear wheel steering control system, and the braking system.

According to an example, if the controller 120 is implemented as a dedicated device, the controller 120 may be set to a standby mode or a sleep mode in a normal state. If a trigger signal according to the occurrence of a failure is received, the controller 120 may be switched to an operation mode and can perform a steering control operation according to the present disclosure.

The control unit 120 may check the occurrence of a failure of the steer-by-wire steering system. According to an example, information on whether a failure occurs, such as a communication failure in the SbW steering system, may be obtained from a separate device and transmitted to the directly determine whether of a failure of the steering system based on a signal output from the sensor 110 or a signal transmitted and received within the steering system.

The controller 120 may include, as shown in FIG. 4, a target yaw rate generation module 121 for generating a target yaw rate according to a target steering angle based on information obtained from the sensor, a differential braking control module 122 for generating a differential braking control signal to follow the target yaw rate and outputting the differential braking control signal to a braking system 200, and a rear wheel steering control module 123 for generating a rear wheel and steering control signal outputting the rear wheel steering control signal to a rear wheel steering system 300. Each module may be implemented in hardware or software or a combination thereof.

if it is determined that a failure has occurred in the steering system, the controller 120 may determine a target yaw rate based on a steering angle corresponding to a target direction for control to target steering direction. According to an example, the controller 120 may receive rotation angle information of a steering wheel of the vehicle from a steering angle sensor provided in the vehicle. The controller 120 may generate a target yaw rate based on rotation angle information of the steering wheel. That is, if the driver's manipulation of the steering wheel is not reflected in the steering control due to a failure such as a communication failure in the steering system, the controller 120 may determine steering angle information, which is rotation angle information of a steering wheel obtained from a steering angle sensor, as target steering information. Accordingly, the controller 120 may determine a target yaw rate value corresponding to the steering angle information.

According to an example, the controller 120 may determine the target yaw rate by setting a plurality of sections for the rotation angle of the steering wheel and setting different sensitivities for each section. That is, the controller 120 may divide a rotatable range of the steering wheel into a plurality of sections according to a predetermined criterion, and may set a lower sensitivity for a section having a large rotation angle. In addition, the controller 120 may set sensitivity information differently according to a vehicle speed. For example, if the vehicle speed is high, the sensitivity may be set lower than when the vehicle speed is low. In addition, according to another example, sensitivity information for each rotation angle with respect to the vehicle speed may be preset and stored as a lookup table.

In this case, the controller 120 may determine the target yaw rate by reflecting sensitivity set for steering angle information for each section. For example, the sensitivity may be set to 1 for a section of 10 degrees or less in a clockwise or counterclockwise direction based on 0 degrees. In addition, the sensitivity may be set to 0.8 for a section of more than 10 degrees and less than 40 degrees. In addition, sensitivity may be set to 0.5 in a section exceeding 40 degrees. Therefore, if the rotation angle of the steering wheel, that is the steering angle is 5 degrees, the corresponding rotation angle information may be used as it is. However, if the rotation angle is 20 degrees, 18 degrees corresponding to $(10*1)+(10*0.8)$ may be used as the rotation angle. However, this is an example and is not limited thereto. The section and sensitivity of the rotation angle may be set differently as needed. Accordingly, it is possible to prevent sudden steering control from occurring if the driver rotates the steering wheel more than a target steering level in the case of a failure of the steering system.

As another example, the controller 120 may receive information about a driving lane, which is a road on which the vehicle travels, and information about other vehicles around the vehicle from the sensor. The controller 120 may determine the target yaw rate based on information about the driving lane and the information about other vehicles. That is, if the driver's manipulation of the steering wheel is not reflected in the steering control due to a failure such as a communication failure in the steering system, the controller 120 may determine a target steering direction reflecting curvature information of the driving lane or driving information of other vehicles and generate a target yaw rate value accordingly.

For example, if it is detected that the driving lane forms a left curve when a failure occurs, the controller 120 may generate the target yaw rate based on the curvature of the driving lane. In addition, if another vehicle enters the driving lane of the host vehicle when a failure occurs, the controller 120 may generate the target yaw rate by reflecting a direction avoiding the another vehicle. In addition, if a shoulder or safety area other than the driving lane is detected, the controller 120 may generate the target yaw rate for steering to the corresponding area.

In addition, for example, the controller 120 may determine the target yaw rate by reflecting steering angle information, information about the driving lane, and information about other vehicles around the vehicle. In this case, the controller 120 may set priorities for each of the steering angle information, the information about the driving lane, and the information about other vehicles around the vehicle, and determine the target yaw rate according to the priorities. For example, though it is detected that the driver rotates the steering wheel clockwise, if it is detected that the driving lane is curved to the left, the controller 120 may determine the target yaw rate by prioritizing information about the driving lane.

Accordingly, if the target yaw rate is determined, the controller 120 may generate and output a differential braking control signal and a rear wheel steering control signal to follow the target yaw rate, and, hereinafter, it will be described in detail with reference to the related drawings.

Figure 5:
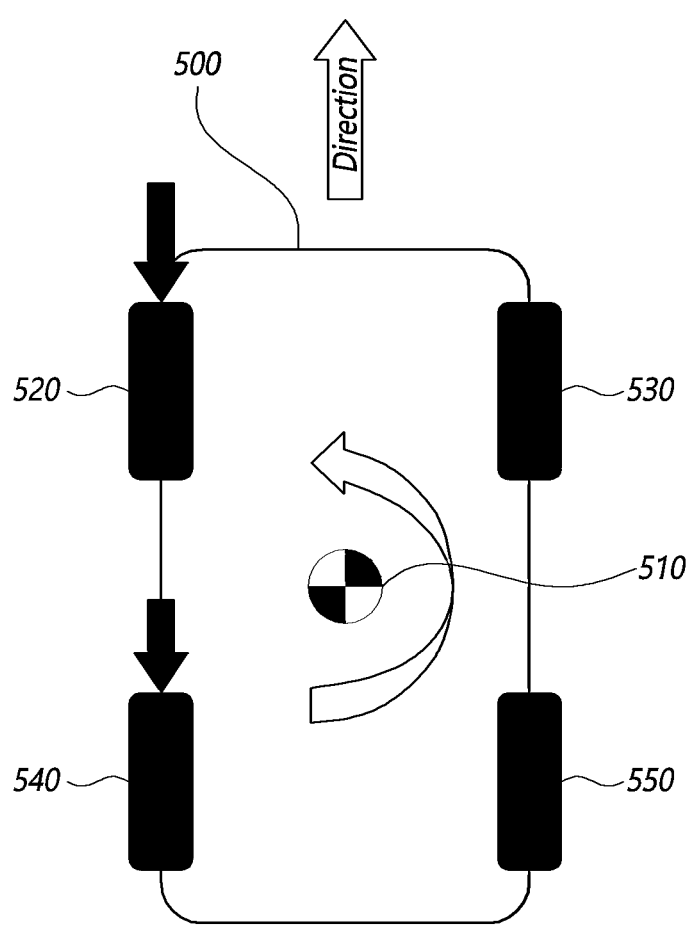
FIGS. 5 to 7 are diagrams for explaining rear wheel steering control after differential braking control according to an embodiment of the present disclosure.
Figure 6:
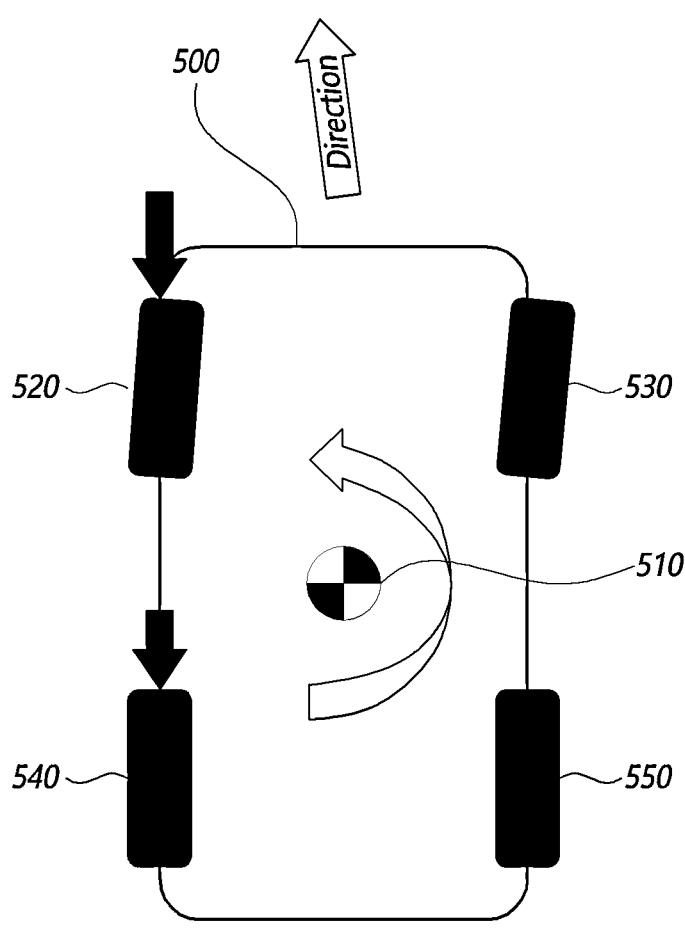
Figure 7:
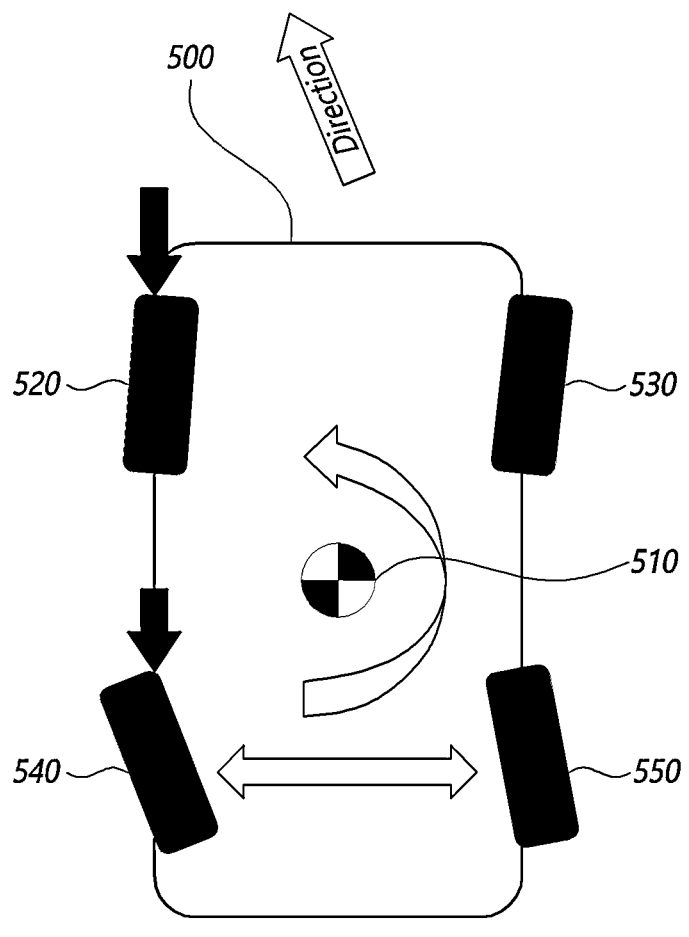

FIGS. 5 to 7 are diagrams for explaining the rear wheel steering control after the differential braking control according to an embodiment of the present disclosure.

According to an example, the controller 120 may generate and output a differential braking control signal for following the target yaw rate to a braking system. In addition, the controller 120 may generate a rear wheel steering control signal for compensating for a front wheel steering angle generated by a scrub radius of the vehicle during the differential braking by the differential braking control signal and output the generated rear wheel steering control signal to the rear wheel steering system.

The controller 120 may control steering of the vehicle by outputting the differential braking control signal to the braking system. That is, if a difference between left and right longitudinal forces due to differential braking is generated in a driving vehicle, the controller 120 may control steering using a yaw moment and a lateral force generated according to the difference between left and right longitudinal forces. Referring to FIG. 5, if the target yaw rate is generated to the left as the steering wheel 510 rotates, braking force may be applied to the left wheels 520 and 540 to follow the target yaw rate.

As an example, a scrub radius of the vehicle may be set to a negative scrub radius. This is to secure straightness of the vehicle by using a wheel angle generated in the opposite direction to the yaw behavior of the vehicle during differential braking. However, if the negative scrub radius is set as described above, as shown in FIG. 6, a wheel angle of the front wheels 520 and 530 (hereinafter also referred to as 'front wheel steering angle') may be generated to the right, opposite to the yaw behavior. In this case, since a yaw moment generated by differential braking and lateral movement are cancelled, there may be deteriorated the performance and efficiency of differential braking control that replaces steering operation.

Accordingly, the controller 120 may generate a rear wheel steering control signal for the rear wheels 540 and 550 to cancel the effect of the front wheel steering angle generated opposite to the target moment and output the generated rear wheel steering control signal to the rear wheel steering system. That is, a moment generated by SbB can be assisted by using RWS control capable of compensating for the effect of the wheel angle of the front wheel. Therefore, the controller 120 may integrate the RWS control with the SbB function to perform an operation of compensating with control assisting in generating the same steering angle as the target direction.

Figure 8:
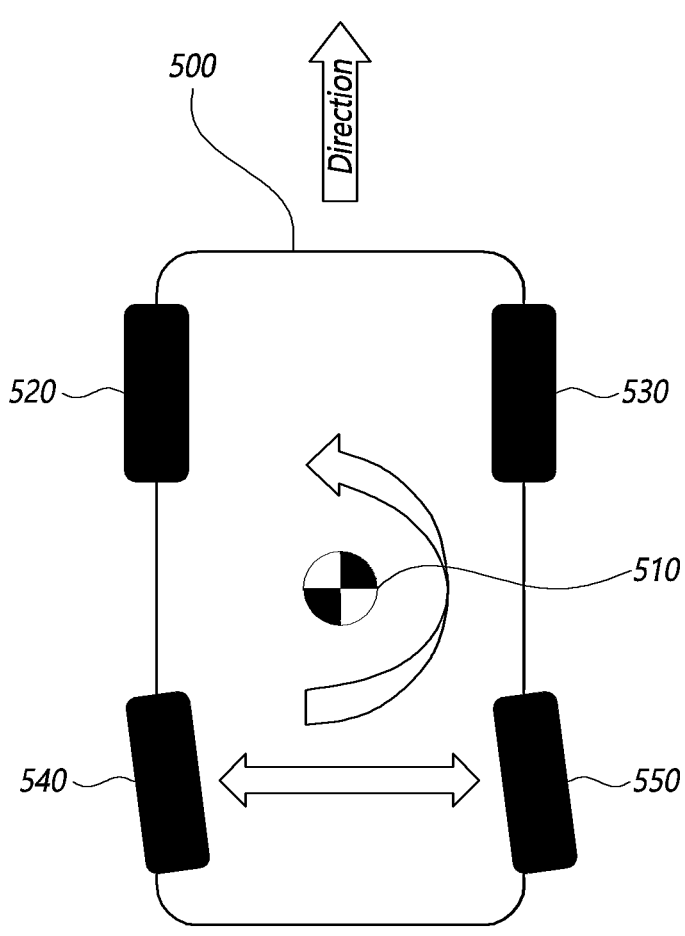
FIGS. 8 to 10 are diagrams for explaining performing differential braking control after rear wheel steering control according to an embodiment of the present disclosure.
Figure 9:
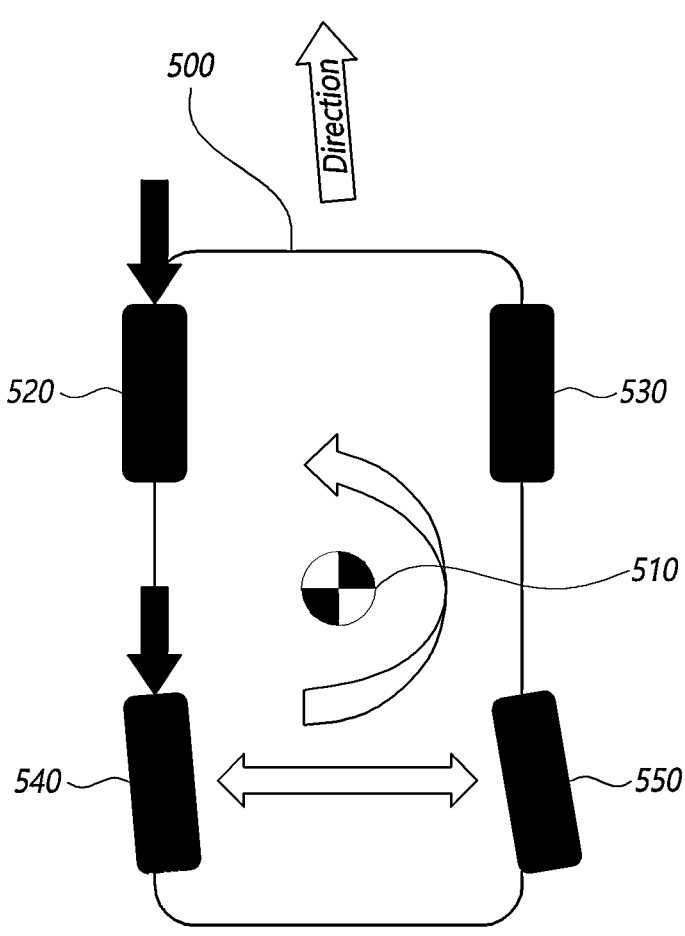
Figure 10:
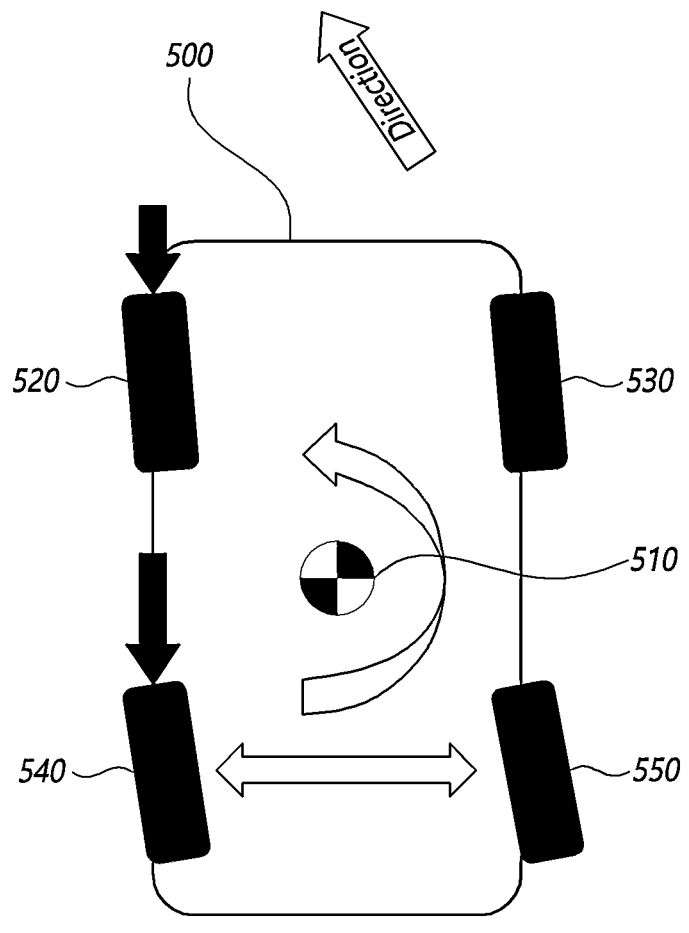

FIGS. 8 to 10 are diagrams for explaining performing differential braking control after rear wheel steering control according to an embodiment of the present disclosure.

As another example, the controller 120 may generate and output a rear wheel steering control signal based on the target yaw rate to the rear wheel steering system, and generate and output a differential braking control signal for following the target yaw rate to the braking system. In this case, the controller 120 may generate and output the rear wheel steering control signal to the rear wheel steering system during a reference time period, and generate and output the differential braking control signal to the braking system after the reference time period.

The controller 120 may generate the rear wheel steering control signal and output the generated rear wheel steering control signal to the rear wheel steering system in order to perform steering corresponding to a target yaw rate. Referring to FIG. 8, if the target yaw rate is generated to the left according to the rotation of the steering wheel 510, the controller may perform rear wheel steering control for rotating the rear wheels 540 and 550 to the left in order to satisfy the target yaw rate.

For example, the controller 120 may generate a steering motion corresponding to the target yaw rate by first performing rear wheel steering control according to the target yaw rate for a predetermined reference time period. That is, as shown in FIG. 9, the driving direction of the vehicle may be changed through rear wheel steering control. Thereafter, the controller 120 may apply braking force to the left wheels 520 and 540 by generating the differential braking control signal for following the target yaw rate.

In this case, as described above, the wheel angles of the front wheels 520 and 530 may be generated to the right, opposite to the yaw behavior, due to the negative scrub radius. However, since the rear wheel steering control is performed in advance before performing differential braking, the front wheel steering angle may be cancelled. Accordingly, as shown in FIG. 10, the front wheels 520 and 530 may be rotated at a slightly gentler angle than the rear wheels 540 and 550. Accordingly, since the front wheels 520 and 530 and the rear wheels 540 and 550 are arranged in the same direction, the vehicle may be steered with a larger turning radius.

That is, the controller 120 may first perform the RWS control operation for a short time period prior to the differential braking-based SbB control to generate steering motion, and then drives the SbB control with a time difference to generate a steering angle equal to the target moment, thereby assisting in producing a larger and smoother steering motion.

Accordingly, in the case that a steering system failure occurs in a vehicle equipped with the SbW system and the RWS system, target steering may be performed using differential braking and rear wheel steering control, thereby providing a safe steering control device and method without additional mechanical design. In addition, the effect of the negative scrub radius during differential braking may be compensated by rear wheel steering control, so that it is possible to secure redundancy of the steering system and a safety of the driver while maintaining a negative scrub radius designed to secure vehicle stability.

Figure 11:
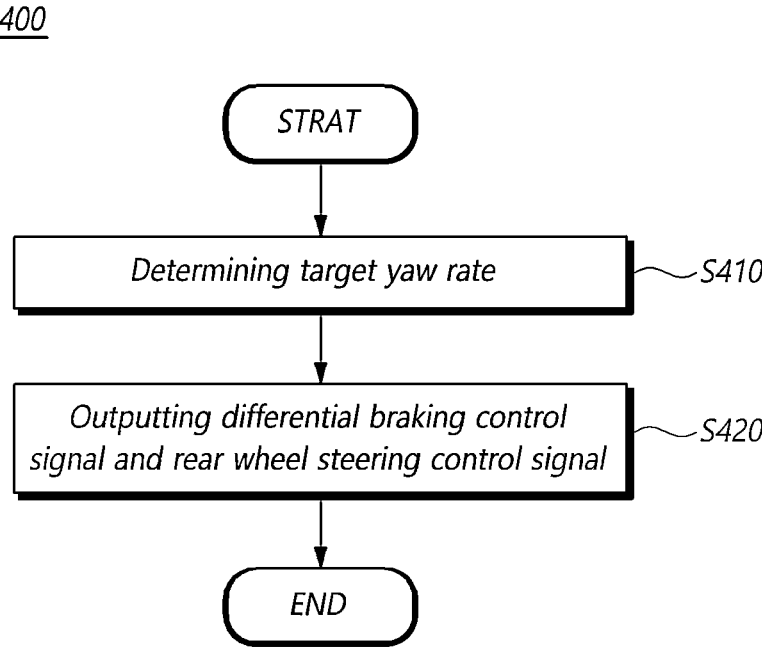
FIG. 11 is a flowchart of a steering control method according to an embodiment of the present disclosure.

FIG. 11 is a flowchart of a steering control method according to an embodiment of the present disclosure.

The steering control method according to the present disclosure may be implemented in the above-described steering control device 100. Hereinafter, it will be described in detail a steering control method according to the present disclosure and an operation of the steering control device 100 for implementing the method with reference to necessary drawings. The foregoing description may be omitted in order to avoid redundant description, and in this case, the omitted content may be substantially equally applied to the following description as long as it does not contradict the technical idea of the present disclosure.

Referring to FIG. 11, if a failure of the steer-by-wire steering system is determined, the steering control device 100 may determine or generate a target yaw rate according to a target steering angle based on information acquired from a sensor (S410).

The steering control device 100 may control steering of a vehicle equipped with a steer-by-wire (SbW) steering system and a rear wheel steering (RWS) system. In addition, the vehicle may include a steer-by-brake (SbB) system.

The steering control device 100 may include various sensors for acquiring information about a host vehicle and information about the outside of the vehicle. According to an example, the steering control device 100 may include one or more sensors for detecting information about the vehicle, such as a steering angle sensor for detecting rotation angle information of a steering wheel of a vehicle, a steering angle velocity sensor for detecting steering angle velocity of a steering wheel, a rack position sensor for detecting position information of a rack, a motor torque sensor for detecting torque of a motor in the steering system, and a current sensor for detecting current in the steering system. In addition, the steering control device 100 may include various sensors such as a camera, LIDAR, and radar sensor for detecting other vehicles or lanes outside the vehicle.

The steering control device 100 may check the occurrence of a failure of the steer-by-wire steering system. According to an example, information on a failure, such as a communication failure in the SbW steering system, may be obtained from a separate device and transmitted to the directly determine whether of a failure of the steering system based on a signal output from the sensor 110 or a signal transmitted and received within the steering system.

If it is determined that a failure has occurred in the steering system, the steering control device 100 may generate or determine a target yaw rate based on a steering angle corresponding to a target direction for control to target steering. According to an example, the steering control device 100 may generate the target yaw rate based on rotation angle information of a steering wheel. That is, if the driver's manipulation of the steering wheel is not reflected in the steering control due to a failure such as a communication failure in the steering system, the steering control device 100 may determine steering angle information, which is rotation angle information of a steering wheel obtained from a steering angle sensor, as target steering. Accordingly, the steering control device 100 may generate a target yaw rate value corresponding to the steering angle information.

As an example, the steering control device 100 may generate the target yaw rate by setting a plurality of sections for the rotation angle of the steering wheel and setting different sensitivities for each section. That is, the steering control device 100 may divide the rotatable range of the steering wheel into a plurality of sections according to a predetermined criterion, and may set a lower sensitivity for a section having a large rotation angle. In addition, the steering control device 100 may set sensitivity information differently according to a vehicle speed. For example, if the vehicle speed is high, the sensitivity may be set lower than when the vehicle speed is low. In addition, according to another example, sensitivity information for each rotation angle with respect to the vehicle speed may be preset and stored as a lookup table.

In this case, the steering control device 100 may generate the target yaw rate by reflecting the sensitivity set in the steering angle information for each section. Accordingly, it is possible to prevent sudden steering control from occurring if the driver rotates the steering wheel more than a target steering level in the case of a failure of the steering system.

As another example, the steering control device 100 may determine the target yaw rate based on information about a driving lane of a vehicle and the information about other vehicles. That is, if the driver's manipulation of the steering wheel is not reflected in the steering control due to a failure such as a communication failure in the steering system, the steering control device 100 may determine a target steering direction reflecting curvature information of the driving lane or driving information of other vehicles and generate a target yaw rate value accordingly.

For example, if it is detected that the driving lane forms a left curve when a failure occurs, the steering control device 100 may generate the target yaw rate based on the curvature of the driving lane. In addition, if another vehicle enters the driving lane of the host vehicle when a failure occurs, the steering control device 100 may generate the target yaw rate by reflecting a direction avoiding the another vehicle. In addition, if a shoulder or safety area other than the driving lane is detected, the steering control device 100 may generate the target yaw rate for steering to the corresponding area.

In addition, for example, the steering control device 100 may determine the target yaw rate by reflecting steering angle information, information about the driving lane, and information about other vehicles around the vehicle. In this case, the steering control device 100 may set priorities for each of the steering angle information, the information about the driving lane, and the information about other vehicles around the vehicle, and determine the target yaw rate according to the priorities.

Referring to FIG. 11, the steering control device 100 may generate and output the differential braking control signal and the rear wheel steering control signal to follow the target yaw rate (S420).

As an example, the steering control device 100 may generate and output a differential braking control signal for following a target yaw rate to a braking system, and generate the rear wheel steering control signal for compensating for a front wheel steering angle generated by a scrub radius of the vehicle during differential braking by the differential braking control signal and output the generated rear wheel steering control signal to the rear wheel steering system.

The steering control device 100 may control steering of the vehicle by outputting the differential braking control signal to the braking system. That is, if a difference between left and right longitudinal forces due to differential braking is generated in a driving vehicle, the steering control device 100 may control steering using a yaw moment and a lateral force generated according to the difference between left and right longitudinal forces. For example, if the target yaw rate is generated to the left as the steering wheel rotates, braking force may be applied to the left wheels to follow the target yaw rate.

As an example, a scrub radius of the vehicle may be set to a negative scrub radius. If the negative scrub radius is set as described above, a wheel angle of the front wheels may be generated to the right, opposite to the yaw behavior. In this case, since a yaw moment generated by differential braking and lateral movement are cancelled, there may be deteriorated the performance and efficiency of differential braking control that replaces steering operation.

Accordingly, the steering control device 100 may generate a rear wheel steering control signal for the rear wheels to cancel the effect of the front wheel steering angle generated opposite to the target moment and output the generated rear wheel steering control signal to the rear wheel steering system. That is, a moment generated by SbB can be assisted by using RWS control capable of compensating for the effect of the wheel angle of the front wheel. Therefore, the steering control device 100 may integrate the RWS control with the SbB function to perform an operation of compensating with control assisting in generating the same steering angle as the target direction.

As another example, the steering control device 100 may generate and output a rear wheel steering control signal based on the target yaw rate to the rear wheel steering system, and generate and output a differential braking control signal for following the target yaw rate to the braking system. In this case, the steering control device 100 may generate and output the rear wheel steering control signal to the rear wheel steering system during a reference time period, and generate and output the differential braking control signal to the braking system after the reference time period.

The steering control device 100 may generate the rear wheel steering control signal and output the generated rear wheel steering control signal to the rear wheel steering system in order to perform steering corresponding to a target yaw rate. If the target yaw rate is generated to the left according to the rotation of the steering wheel, the steering control device 100 may perform rear wheel steering control for rotating the rear wheels to the left in order to satisfy the target yaw rate.

For example, the steering control device 100 may generate a steering motion corresponding to the target yaw rate by first performing wheel rear steering control according to the target yaw rate for a predetermined reference time period.

The driving direction of the vehicle may be changed through rear wheel steering control. Thereafter, the steering control device 100 may apply braking force to the left wheels by generating the differential braking control signal for following the target yaw rate.

In this case, as described above, the wheel angles of the front wheels may be generated to the right, opposite to the yaw behavior, due to the negative scrub radius. However, since the rear wheel steering control is performed in advance before performing differential braking, the front wheel steering angle may be cancelled. Accordingly, since the front wheels and the rear wheels are arranged in the same direction, the vehicle may be steered with a larger turning radius.

That is, the steering control device 100 may first perform the RWS control operation for a short time period prior to the differential braking-based SbB control to generate steering motion, and then drives the SbB control with a time difference to generate a steering angle equal to the target moment, thereby assisting in producing a larger and smoother steering motion.

Accordingly, in the case that a steering system failure occurs in a vehicle equipped with the SbW system and the RWS system, target steering may be performed using differential braking and rear wheel steering control, thereby providing a safe steering control device and method without additional mechanical design. In addition, the effect of the negative scrub radius during differential braking may be compensated by rear wheel steering control, so that it is possible to secure redundancy of the steering system and a safety of the driver while maintaining a negative scrub radius designed to secure vehicle stability.

Figure 12:
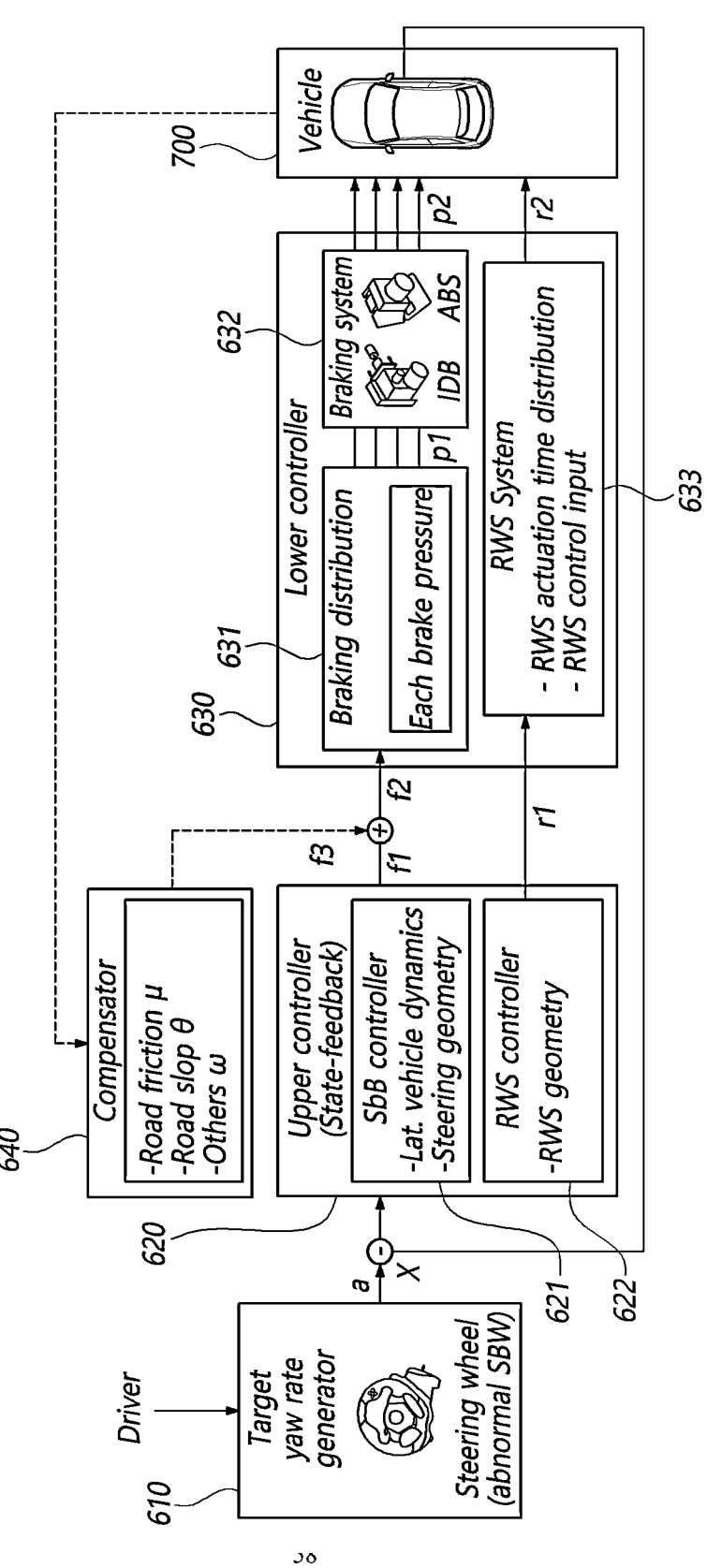
FIG. 12 is a diagram for explaining the operation of a steering control system according to an embodiment of the present disclosure.

FIG. 12 is a diagram for explaining the operation of a steering control system according to an embodiment of the present disclosure.

Even if the steering system has a failure, a signal of the driver's steering manipulation may be normally detected through a steering wheel angle sensor (SAS) mounted on a steering feedback actuator (SFA) of the SbW system. That is, a target yaw rate generator 610 may generate a target yaw rate 'a' based on SAS detection information corresponding to the driver's steering manipulation.

An upper controller 620 may calculate, through a SbB controller 621, a target differential force (f1) control input for minimizing an error between a control target and a vehicle state in real time by a state-feedback control. However, the f1 value may not be sufficient due to other external factors such as road surface friction and slope. In order to reflect these external influences in the control, a compensator 640 may derive a compensating differential force f3 and compensates the compensating differential force f3 to f1 to calculate a final differential force f2.

A lower controller 630 may convert f2 derived from the upper controller into a braking torque of each wheel, and an integrated dynamic brake (IDB) system 631 may distribute a braking pressure p1 to a caliper actuator in order to generate a braking torque. In preparation for safety, in the case that wheel slip occurs during control, an ABS and ESC logic 632 inside the IDB system may be executed so that the braking pressure p2 may be applied.

In addition, the upper controller 620 may calculate a target torque value r1 for a rear wheel steering motor through a RWS controller 622. The lower controller 630 may control the rear wheel steering using an actual torque value r2 corresponding to the target torque value through a rear wheel steering control system 633.

In this case, as described above, the upper controller 620 may use the SbB controller 621 and the RWS controller 622 together to provide more smooth, stable, and efficient steering redundancy.

The present disclosure described above may be implemented as computer readable codes in a medium recording a program. The computer-readable medium may include all types of recording devices storing data capable of being read by a computer system is stored. Examples of computer-readable media may include a hard disk drive (HDD), a solid state disk (SSD), a silicon disk drive (SDD), ROM, RAM, CD-ROM, magnetic tape, floppy disk, optical data storage device, and may also include those implemented in the form of a carrier wave (e.g., transmission over the Internet). In addition, the computer may include the controller 120 of the present disclosure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device of a vehicle equipped with a steer-by-wire steering system and a rear wheel steering system, comprising:

a sensor configured to acquire information on the vehicle; and a controller configured to, in response to a determination of a failure of the steer-by-wire steering system, determine a target yaw rate according to a target steering angle based on the information acquired from the sensor, and generate and output a differential braking control signal and a rear wheel steering control signal to follow the target yaw rate, wherein the controller generates the rear wheel steering control signal based on the target yaw rate and outputs the rear wheel steering control signal to the rear wheel steering system, and generates the differential braking control signal for following the target yaw rate and outputs the differential braking control signal to a braking system, wherein the controller generates and outputs the rear wheel steering control signal to the rear wheel steering system during a reference time period, and generates and outputs the differential braking control signal to the braking system after the reference time period to produce a larger and smoother steering motion.

2. The steering control device of claim 1, wherein the sensor comprises a steering angle sensor for obtaining rotation angle information of a steering wheel of the vehicle, wherein the controller determines the target yaw rate based on the rotation angle information of the steering wheel.

3. The steering control device of claim 2, wherein the controller sets a plurality of sections for a rotation angle of the steering wheel, and sets different sensitivities for each section to determine the target yaw rate.

4. The steering control device of claim 1, wherein the sensor acquires information about a road on which the vehicle travels and information about other vehicles around the vehicle, wherein the controller determines the target yaw rate based on the information about the road and the information about the other vehicle.

5. A steering control method of a vehicle equipped with a steer-by-wire steering system and a rear wheel steering system, comprising:

determining, in response to a determination of a failure of the steer-by-wire steering system, a target yaw rate according to a target steering angle based on information acquired from a sensor; and generating and outputting a differential braking control signal and a rear wheel steering control signal to follow the target yaw rate, wherein the generating and outputting comprises generating the rear wheel steering control signal based on the target yaw rate and outputting the rear wheel steering control signal to the rear wheel steering system, and generating the differential braking control signal for following the target yaw rate and outputting the differential braking control signal to a braking system, wherein the generating and outputting comprises generating and outputting the rear wheel steering control signal to the rear wheel steering system during a reference time period, and generating and outputting the differential braking control signal to the braking system after the reference time period to produce a larger and smoother steering motion.

6. The steering control method of claim 5, wherein the determining comprises determining the target yaw rate based on rotation angle information of a steering wheel of the vehicle obtained from a steering angle sensor.

7. The steering control method of claim 6, wherein the determining comprises setting a plurality of sections for a rotation angle of the steering wheel, and setting different sensitivities for each section to determine the target yaw rate.

8. The steering control method of claim 5, wherein the determining comprises determining the target yaw rate based on information about a road on which the vehicle travels and information about other vehicles around the vehicle.

\* \* \* \* \*